United States Patent
Deckers et al.

(10) Patent No.: US 6,649,788 B2
(45) Date of Patent: Nov. 18, 2003

(54) PREPARATION OF POLYETHYLENE WAXES

(75) Inventors: Andreas Deckers, Flomborn (DE);
Wilhelm Weber, Neustadt (DE);
Frank-Olaf Mähling, Mannheim (DE);
Lars Wittkowski, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 224 days.

(21) Appl. No.: 09/809,252

(22) Filed: Mar. 16, 2001

(65) Prior Publication Data
US 2001/0034466 A1 Oct. 25, 2001

(30) Foreign Application Priority Data
Mar. 16, 2000 (DE) .......................... 100 12 775

(51) Int. Cl.[7] .............................. C07C 69/52
(52) U.S. Cl. ...................... 560/225; 560/205
(58) Field of Search ................. 560/205, 225

(56) References Cited

FOREIGN PATENT DOCUMENTS

| | | |
|---|---|---|
| EP | 0 813 550 | 11/1999 |
| GB | 1058967 | 2/1967 |
| WO | WO 96/27620 | 9/1996 |
| WO | WO 01/68723 | 9/2001 |

OTHER PUBLICATIONS

Ullmann's Encyclopädie der technischen Chemie, Band 19, S. 169 und S. 173 ff. (1980), Verlag Chemie Weinheim, Deerfield Beach, Basel, pp. 169–178.
Ullmann's Encyclopädie der technischen Chemie, Band 19, S. 169 und S. 173 ff. (1980), Verlag Chemie Weinheim, Deerfield Beach, Basel, pp. 36–45, with English Translation.

*Primary Examiner*—Paul J. Killos
(74) *Attorney, Agent, or Firm*—Oblon, Spivak, McClelland, Maier & Neustadt, P.C.

(57) ABSTRACT

In a process for preparing polyethylene waxes at from 200 to 350° C. and pressures in the range from 500 to 4 000 bar using molar mass regulators, a peroxide mixture comprising from 5 to 95% by weight of at least one cyclic peroxide of the formula I,

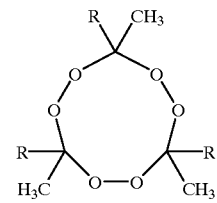

where the radicals R are identical or different and are selected from among alkyl groups and aryl groups, is used as free radical initiator and a molar $H_2$/ethylene ratio of from 1:2 000 to 1:40 000 is employed.

5 Claims, No Drawings

PREPARATION OF POLYETHYLENE WAXES

The present invention relates to a process for preparing polyethylene waxes at from 200 to 350° C. and pressures in the range from 500 to 4 000 bar using molar mass regulators, wherein a peroxide mixture comprising from 5 to 95% by weight of at least one cyclic peroxide of the formula I,

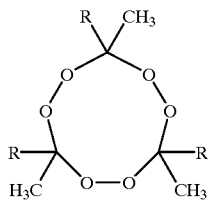

where the radicals R are identical or different and are selected from among alkyl groups and aryl groups, is used as free radical initiator and a molar H$_2$/ethylene ratio of from 1:2 000 to 1:40 000 is employed.

The preparation of homopolymers and copolymers of ethylene by high-pressure processes is carried out industrially on a large scale. In these processes, pressures above 500 bar and temperatures of 150° C. and above are used. The process is generally carried out in high-pressure autoclaves or in tube reactors. High-pressure autoclaves are known in squat or elongated embodiments. The known tube reactors (*Ullmanns Encyclopädie der technischen Chemie*, Volume 19, p. 169 and p. 173 ff, (1980), Verlag Chemie Weinheim, Deerfield Beach, Basle, and *Ullmann's Encyclopädie der technischen Chemie*, 4th Edition, keywords: waxes, Vol. 24, p. 36 ff., Thieme Verlag Stuttgart, 1977) are easy to handle and have low maintenance requirements and are advantageous compared to stirred autoclaves. However, the conversions which can be achieved in the abovementioned apparatuses are limited and generally do not exceed 30%.

To increase the capacity of available apparatuses, attempts are made to achieve very high conversions. However, limitations are imposed by polymerization temperature and polymerization pressure which, depending on the product type, have a specific upper limit. For LDPE waxes, this upper limit is about 330° C.; above this, spontaneous ethylene decomposition can occur. Furthermore, efforts are made to improve heat removal by means of a very low wall temperature. However, below a temperature of 150° C., heat removal problems can occur as a result of the formation of laminar polyethylene layers which can act as insulator. Furthermore, the pressure drop which occurs is a limiting factor; this pressure drop increases with decreasing temperature.

The conversion can be increased within certain limits by appropriate choice of free radical initiator. Free radical initiators which decompose quickly but can nevertheless be handled safely are desirable. A good method of testing the decomposition rate of a free radical initiator in the high-pressure process is to record the temperature profile. For this purpose, the temperature profile is recorded over the length of the reactor in a polymerization in a high-pressure tube reactor. Immediately after the first introduction of the initiator, the temperature rises due to the polymerization reaction enthalpy liberated and then drops again. At the temperature minimum T$_{min}$, initiator is again introduced and the temperature once more rises steeply and then drops again. At the next temperature minimum, initiator is again metered in. The greater the temperature difference between temperature maximum and minimum, the higher the conversion. A critical indication of the complete reaction of a peroxide is the cooling curve which is steeper when complete decomposition occurs than in cases in which part of the peroxide remains in the reaction mixture even after the actual reaction zone.

In general, a plurality of peroxides of which at least one decomposes at a comparatively low temperature are initially introduced at the starting point, i.e. at the beginning of the reactor.

For various reasons it would be desirable to introduce initiator at a large number of points; however, owing to the high cost of the pumps which are necessary at each introduction point, the number of introduction points is limited by econimic and engineering considerations.

EP-B 0 813 550 discloses that cyclic peroxo compounds of the formulae P$^1$ to p$^3$ can be used for polymerizing ethylene in the high-pressure process.

P$^1$

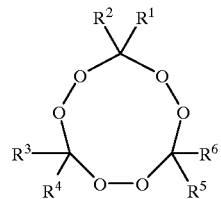

P$^2$

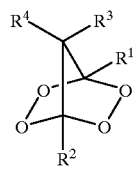

p$^3$

However, it has been found that the conversion is still too low when using the most important conventional free radical initiators. The most important conventional free radical initiators are dibenzoyl peroxide, di-tert-butyl peroxide, tert-butyl perpivalate ("TBPP") and tert-butyl perisononanoate ("TBPIN"). If the conversion is too low, the economics of the high-pressure process are adversely affected. The conversions when using the peroxides of the formulae P$^1$ to p$^3$ are also too low.

The molecular weight of the product in the high-pressure process can be influenced by regulators such as aldehydes, ketones or hydrogen; however, no influence on the covnersion has been found when using conventional peroxides (GB 1,058,967).

It is an object of the present invention to provide a process by means of which the conversion in the high-pressure polymerization of ethylene is increased further.

We have found that this object is achieved by using mixtures of conventional peroxides comprising from 5 to 95% by weight of commercial cyclic peroxo compounds of the formula I and employing a molar H$_2$/ethylene ratio of from 1:2 000 to 1:40 000 to increase the conversion further in the preparation of polyethylene waxes by the high-pressure process, thus making it possible to achieve conversions higher than those hitherto customary.

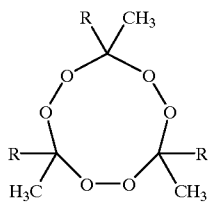

In this formula, the radicals R are identical or different and are selected from among $C_1$–$C_8$-alkyl such as methyl, ethyl, n-propyl, isopropyl, n-butyl, sec-butyl, isobutyl, tert-butyl, n-pentyl, sec-pentyl, isopentyl, n-hexyl, isohexyl, sec-hexyl, n-heptyl, n-octyl; preferably linear $C_1$–$C_6$-alkyl such as methyl, ethyl, n-propyl, n-butyl, n-pentyl, n-hexyl, particularly preferably linear $C_1$–$C_4$-alkyl such as methyl, ethyl, n-propyl and n-butyl, very particularly preferably ethyl;

$C_6$–$C_{14}$-aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl.

The preparation of such trimeric ketone peroxides can be achieved by condensation of the corresponding ketones with hydrogen peroxide in the presence of strong mineral acids and is described in the literature (for example R. Criegee, in *Methoden der Organischen Chemie* (Houben-Weyl), Vol. 8, p. 46, Georg-Thieme-Verlag, Stuttgart 1952 or EP-A 0 813 550).

The mixtures of the peroxides are made up so that they comprise at least one peroxide decomposing at high temperature, i.e. it does not decompose until a relatively high temperature is reached, and also at least one peroxide decomposing at intermediate temperature.

The distinction between peroxides decomposing at high temperature and peroxides decomposing at intermediate temperature is made by means of the temperatures at which the half lives $t_{1/2}$ for the decomposition are 10, 1 or 0.1 hours; it is most usual to report the temperature at which the half life is 0.1 hour.

Peroxides decomposing at intermediate temperature have a half life of 0.1 hour at temperatures of from 100 to 140° C.

Peroxides decomposing at high temperature have a half life of 0.1 hour at temperatures above 140° C.

There is a wide choice of commercially available peroxides, for example the Trigonox® or Perkadox® products from Akzo Nobel. Examples of commercially available peroxides decomposing at intermediate temperature are: didecanoyl peroxide, 2,5-dimethyl-2,5-di(2-ethylhexanoylperoxy)hexane, tert-amyl peroxy-2-ethylhexanoate, dibenzoyl peroxide, tert-butyl peroxy-2-ethylhexanoate, tert-butyl peroxydiethylacetate, tert-butyl peroxydiethylisobutyrate, 1,4-di(tert-butylperoxycarbo)cyclohexane as isomer mixture, tert-butyl perisononanoate, 1,1-di(tert-butylperoxy)-3,3,5-trimethylcyclohexane, 1,1-di(tert-butylperoxy)cyclohexane, methyl isobutyl ketone peroxide, tert-butylperoxy isopropyl carbonate, 2,2-di(tert-butylperoxy)butane and tert-butyl peroxyacetate.

Examples of conventional commercially available peroxides decomposing at high temperature are:
tert-butyl peroxybenzoate, di-tert-amyl peroxide, dicumyl peroxide, the isomeric di(tert-butylperoxyisopropyl) benzenes, 2,5-dimethyl-2,5-di-tert-butylperoxyhexane, tert-butylcumyl peroxide, 2,5-dimethyl-2,5-di(tert-butylperoxy)-hex-3-yne, Di-tert-butyl peroxide, 1,3-diisopropyl monohydroperoxide, cumene hydroperoxide and tert-butyl hydroperoxide.

The trimeric ketone peroxides of the formula I can be classified as peroxides decomposing at high temperature.

The half lives of peroxides are usually determined by a generally used laboratory method:

Firstly, a number of ampoules or test tubes containing a dilute solution having a concentration $c_0$ of less than 0.2 mol/l, preferably less than 0.1 mol/l, of the peroxide to be examined are prepared, using an inert solvent, i.e. one which does not react with peroxides; preference is given to benzene, toluene or chlorobenzene.

These ampoules are thermostated at a defined temperature. At defined time intervals, e.g. 1, 2, 3, 4, 6, 8 hours, an ampoule is taken out, cooled quickly and then analyzed to determine the residual peroxide content $c_t$. This analysis is preferably carried out titrimetrically. Evaluation is carried out graphically. The relative concentration is plotted logarithmically against the reaction time, so that the half live at $c_t/c_0=0.5$ can be read off on the ordinate.

To determine the temperature dependence, this measurement is repeated at various temperatures.

The mixtures used according to the present invention as free radical initiators comprise
from 5 to 95% by weight of one or more trimeric ketone peroxides as peroxides decomposing at high temperature, preferably from 10 to 75% by weight and particularly preferably from 20 to 66% by weight;
from 5 to 95% by weight of one or more conventional peroxides as peroxides decomposing at intermediate temperature, preferably from 25 to 90% by weight and particularly preferably from 34 to 80% by weight.

The peroxides, which are extremely shock- and impact-sensitive in the pure state, are advantageously metered as a solution in hydrocarbons, for example using isododecane as solvent. The peroxide mixtures are present in the solutions in concentrations of from 5 to 60% by weight, preferably from 15 to 40% by weight.

It is important that the mixture of the peroxides is introduced in the presence of hydrogen, with a molar $H_2$/ethylene ratio of from 1:2 000 to 1:40 000 being used to increase the conversion further. This procedure significantly increases the conversion of ethylene. This is surprising since hydrogen has previously been known to perform only a molar-mass-regulating function in the free-radical polymerization of ethylene.

The polymerization of ethylene is usually carried out at pressures of from 400 to 4 000 bar, preferably from 500 to 5 000 bar and particularly preferably from 1 000 to 3 500 bar.

The reaction temperature is from 150 to 350° C., preferably from 160 to 320° C.

Ethylene is particularly suitable as monomer in the polymerization process of the present invention. It is also possible to prepare copolymers of ethylene, in which case all olefins which can be copolymerized with ethylene by a free radical mechanism are in principle suitable as comonomers. Preference is given to
1-olefins such as propylene, 1-butene, 1-pentene, 1-hexene, 1-octene and 1-decene, acrylates such as acrylic acid, methyl acrylate, ethyl acrylate, n-butyl acrylate, 2-ethylhexyl acrylate or tert-butyl acrylate;

methacrylic acid, methyl methacrylate, ethyl methacrylate, n-butyl methacrylate or tert-butyl methacrylate;

vinyl carboxylates, particularly preferably vinyl acetate, 10-unsaturated dicarboxylic acids, particularly preferably maleic acid, unsaturated dicarboxylic acid derivatives, particularly preferably maleic anhydride and alkylimides of maleic acid, e.g. N-methylmaleimide.

Firther suitable molar mass regulators are aliphatic aldehydes, ketones, CH-acid compounds such as mercaptans or alcohols, olefins and alkanes and also mixtures of one or more examples of the various classes of compounds. Preference is given to aldehydes and ketones.

The waxes obtainable by the process of the present invention are known per se. They have molar masses Mw below 20 000 g/mol, preferably below 10 000 g/mol and particularly preferably below 7 500 g/mol.

The process of the present invention is illustrated by the examples.

EXAMPLES

The polymerization was carried out in a high-pressure tube autoclave as described in *Ullmanns Encyclopädie der technischen Chemie*, Volume 19, p. 169 and p. 173 ff. (1980). It had the following dimensions: 400 m length, 32 mm diameter. The experiments were carried out under the following conditions:

Ethylene throughput: 10 metric tons/h
Pressure: 1 900 bar
Propionaldehyde was used as regulator.
Product:
  $M_w$=6 300 g/mol
  $M_n$=2 100 g/mol
  Density=0.918 g/cm$^3$.
Viscosity at 120° C. =1 100 to 1 300 mm2/s
The results are shown in Table 1.

In the examples 1 and 2 according to the present invention, a mixture of peroxides comprising 3,6,9-trimethyl-3,6,9-triethyl-1,2,4,5,7,8-hexaoxanonane (nomenclature according to the Hantzsch-Widmann system) was employed in each case and hydrogen was metered in.

In comparative example C1, the polymerization was carried out without 3,6,9-trimethyl-3,6,9-triethyl-1,2,4,5,7,8-hexaoxanonane; in comparative example C2, pure 3,6,9-trimethyl-3,6,9-triethyl-1,2,4,5,7,8-hexaoxanonane was used as peroxide mixture 2. In comparative example C3, initiation was carried out using a mixture comprising 3,6,9-trimethyl-3,6,9-triethyl-1,2,4,5,7,8-hexaoxanonane but no hydrogen was added.

TABLE 1

Results of the polymerization experiments

| Experiment No. | $H_2$ [standard m$^3$/h][i] | $H_2/C_2H_4$ [mol/mol] | Peroxide mixture[ii] 1 | Peroxide mixture[iii] 2 | $T_{start}$ | $T_{max}^1$ | $T_{min}^1$ | $T_{max}^2$ | $T_{min}^2$ | $T_{max}^3$ | $T_{min}^3$ | $T_{max}^4$ | Conversion [%] |
|---|---|---|---|---|---|---|---|---|---|---|---|---|---|
| 1 | 5 | 1:25 000 | A | B | 175 | 285 | 249 | 295 | 241 | 297 | 249 | 294 | 32.1 |
| 2 | 10 | 1:12 000 | A | B | 174 | 287 | 249 | 301 | 245 | 299 | 252 | 297 | 33.0 |
| C1 | 5 | 1:25 000 | A | C | 174 | 285 | 250 | 293 | 250 | 296 | 260 | 293 | 28.1 |
| C2 | 5 | 1:25 000 | A | D | 173 | 286 | 250 | 276 | 263 | 291 | 269 | 290 | 25.3 |
| C3 | — | 0 | A | B | 174 | 285 | 250 | 294 | 259 | 296 | 261 | 295 | 29.6 |

Peroxide mixture A:
40% by weight of tert-butyl perpivalate
40% by weight of tert-butyl perisononanoate
20% by weight of di-tert-butyl peroxide
Peroxide mixture B:
67% by weight of tert-butyl perisononanoate
33% by weight of 3,6,9-trimethyl-3,6,9-triethyl-1,2,4,5,7,8-hexaoxanonane
[i]standard Nm$^3$/h: standard cubic meters per hour
[ii]introduced at $T_{start}$
[iii]introduced at $T_{min}^1$ to $T_{min}^3$.
Peroxide mixture C:
67% by weight of tert-butyl perisononanoate
33% by weight of di-tert-butyl peroxide
Peroxide mixture D:
100% by weight of 3,6,9-trimethyl-3,6,9-triethyl-1,2,4,5,7,8-hexaoxanonane
The figures in % by weight refer to the calculated content of pure peroxide.
For safety reasons, all peroxides were used as about 15% strength by weight solutions in isododecane.

We claim:

1. A process for preparing polyethylene waxes at from 200 to 350° C. and pressures in the range from 500 to 4 000 bar using molar mass regulators, wherein a peroxide mixture comprising from 5 to 95% by weight of at least one cyclic peroxide of the formula I,

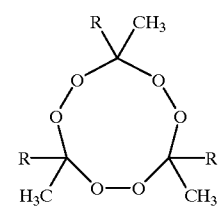

where the radicals r are identical or different and are selected from among alkyl groups and aryl groups, is used as free radical initiator and a molar H$_2$/ethylene ratio of from 1:2 000 to 1:40 000 is employed.

2. A process as claimed in claim 1, wherein a molar H$_2$/ethylene ratio of from 1:5 000 to 1:25 000 is employed.

3. A process as claimed in claim 1 or 2, wherein the radicals R are selected from among linear $C_1$–$C_8$-alkyl groups.

4. A process as claimed in claim 1, wherein all radicals R are ethyl.

5. A process as claimed in claim 1, wherein ethylene is copolymerized with one or more oliefins which can be copolymerized by a free radical mechanism, preferably selected from among 1-olefins, acrylic acid, acrylic esters, methacrylic acid, methacrylic esters, vinyl carboxylates, unsaturated dicarboxylic acids and derivatives of unsaturated dicarboxylic acids.

* * * * *